J. L. PERKINS.

CALENDERING ROLL.

APPLICATION FILED MAR. 8, 1910.

Reissued July 5, 1910. 13,127.

Witnesses

J. D. Long

G. A. Driscoll

Inventor

John Lewis Perkins by W. S. Bellows

Attorney

UNITED STATES PATENT OFFICE.

JOHN LEWIS PERKINS, OF HOLYOKE, MASSACHUSETTS.

CALENDERING-ROLL.

13,127. Specification of Reissued Letters Patent. Reissued July 5, 1910.

Original No. 861,888, dated July 30, 1907, Serial No. 350,465. Application for reissue filed March 8, 1910. Serial No. 548,100.

DIVISION A.

*To all whom it may concern:*

Be it known that I, JOHN LEWIS PERKINS, a citizen of the United States of America, and a resident of Holyoke, in the county of Hampden and State of Massachusetts, have invented certain new and useful Improvements in Calendering-Rolls, of which the following is a full, clear, and exact description.

This invention consists in a calendering roll constructed substantially as illustrated in the accompanying drawings, and as set forth in the description hereinafter given and pointed out in the claims, for results and advantages hereinafter described and explained.

The present case is an application for a divisional reissue of Letters Patent 861,888, granted July 30, 1907, of which I am now sole owner; the parent application being filed of even date with this case and bearing Serial Number 548,101.

Figure 1:
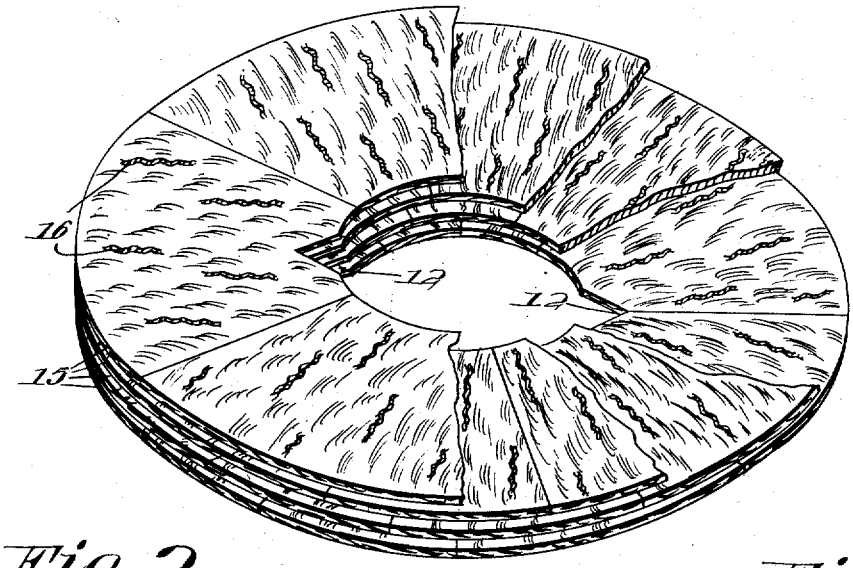
Figure 2:
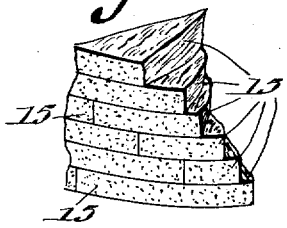
Figure 3:
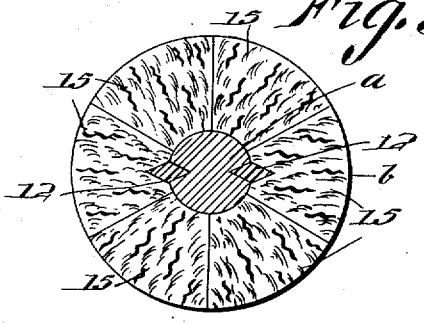
Figure 4:
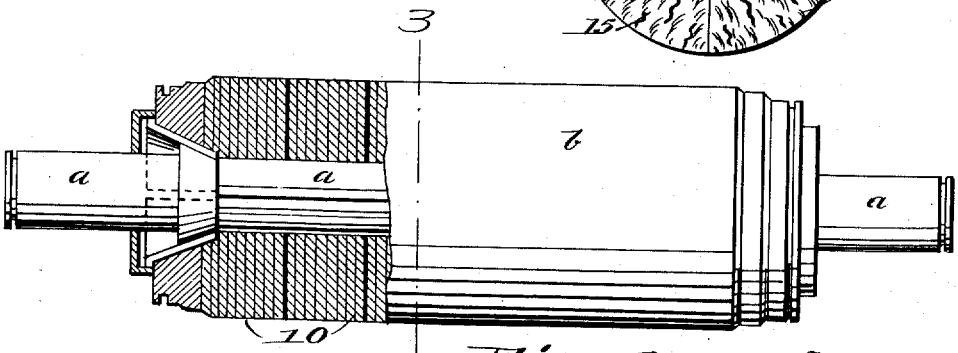

In the drawings:—Figure 1 is a perspective view of a portion of an annular block or "cheese," a considerable number of which, in compressed form, constitute the body of the roll. Fig. 2 is a perspective view, on an enlarged scale, of a portion of one of the annular blocks or cheeses for making additionally clear the relative arrangement of the fibers of the successive layers. Fig. 3 is a cross sectional view as taken on line 3—3 of the complete roll shown in Fig. 4, portions of thin layers of the carded cotton being broken away to show the relative arrangement of the fibers of the adjacent layers, and Fig. 4 is a side elevation of the complete calendering roll with one end portion thereof shown in central longitudinal section.

The roll consists of a central shaft or arbor *a* and an encircling body *b* of cotton having the majority of the fibers thereof substantially radially disposed, said body of cotton being, by a hydraulic ram exerting hundreds of tons pressure, compressed to hard condition, the roll being made or finished with a smooth periphery of uniform character throughout, and susceptible of having the same uniform character when refinished or turned from time to time after protracted use, it being particularly emphasized that the majority of the fibers of the cotton are throughout the entire body of the roll in endwise presentation to the periphery,—said calendering roll, furthermore, being provided with metallic end heads between which the body of the roll is confined in its hard compression.

In carrying out this invention in the most practicable and expeditious manner, I build up annular blocks or cheeses 10, 10, of segmental layers of cotton felt carded with the fibers thereof arranged radially placing the joints of one layer at a slight angle to those of the next, and so on successively. Thus it will be seen that the joints formed between the segments of one layer will be covered by the central parts of the segments of adjacent layers, in a manner clearly depicted in Fig. 2. Spline cuts 12 are formed in the body in opposition at the boundary of the central opening therein, the body being fitted about the roll shaft *a* to which one of the end heads *c* is secured, and this with several other of the so produced cheeses are subjected for a suitably longer time to an extremely high hydraulic pressure until the portion of the body of the roll constituted by a given number of cheeses is compressed to a suitably solid and hard condition.

Additional numbers of the annular blocks or cheeses are then added on the roll shaft and subjected to a squeezing action in the hydraulic press until the roll body of sufficient length is completed, whereupon the other end head is applied and secured in an already well known manner.

In the drawings, 15, 15, represent the different superimposed layers of the cotton carded with the fibers thereof in radial arrangement. The layers are each in the form of an annulus and offset so that the fibers thereof are arranged at say from 20 to 25 degrees to those of the next, each layer being made of a plurality of segments matched together, preferably with their edges slightly overlapping, practically incidental to the make-up of the cheese, the parallel fibers in each segment being radial to the roll axis.

As well known, a calendering machine usually comprises a stack of calendering rolls, a number of which are metallic rolls, while other and relatively intermediate rolls are those having a non-metallic body.

The character or quality of the resistance of the body of non-metallic roll is of the utmost importance for surfacing or finishing paper and cloth.

In some cases rolls having paper bodies are adapted for a given required quality of finish, while in many other cases alternated calender rolls having hard compressed cotton bodies may only be employed, and a cotton body roll has acquired an established status in the art of calendering. Cotton body rolls have, however, so far as produced for commercial purposes, usually been made from #17 cotton with the fibers thereof promiscuously arranged, and a roll so made is one which lacks in a most material degree the wearing qualities and satisfactory surfacing capabilities which the present roll possesses. And notwithstanding that after long use of one of the calender rolls of the present fabrication it may become worn and somewhat untrue, and require to be newly returned and refinished, the so refinished roll will be as effective and satisfactory as it was in its initial condition of completed manufacture.

It has been proposed to construct a roll made up of layers or comparatively thin bodies of cotton, each layer consisting of a plurality of films or sheets of carded cotton, the fibers of each sheet being parallel, and each sheet relatively to the next being arranged with its fibers at substantially right angles to those of the next, but such a roll, so far as known, has never been commercially produced, and such roll could not possess the quality of having the majority of the fibers thereof in a substantially radial disposition, for while half of the fibers will be radial to opposite peripheral portions of the roll body, another full half of the fibers will be in sidewise instead of endwise presentation to the same given opposite peripheral portions of the roll, and there can be no practical uniformity and homogeneity in character of the roll body both at its surface and inside thereof, as are the aim and accomplishment of this invention.

I furthermore find it advantageous to employ cotton strands 16 which may be twisted threads or slivers, or rovings, incorporated with the carded fibers making up the superposed layers, such serving as binders and reinforcement in the roll body.

What I claim:

1. A paper calendering roll consisting of a central shaft and an encircling body of cotton having the majority of its fibers substantially radially disposed, said body of cotton being compressed to hard condition and made with a smooth periphery of uniform character throughout, and relatively to which periphery the majority of the fibers are in endwise presentation, and the metallic end heads between which the body of the roll is confined in its hard compression.

2. A paper calendering roll including a shaft and an encircling body of cotton composed of a plurality of layers, each layer being formed of a plurality of segments, the fibers of each segment being radially disposed with respect to the periphery of said body.

3. A calendering roll comprising a central shaft, and an encircling body of cotton composed of a series of layers, each layer being composed of a series of segments, the fibers of each segment being radial to the periphery of the body, the joints between the segments of each layer being out of alinement with the joints of the segments of adjacent layers.

4. A calendering roll comprising a central shaft, and an encircling body of cotton composed of a series of layers, each layer being composed of a series of segments, the joints between the segments of each layer being out of alinement with the joints of the segments of adjacent layers.

JOHN LEWIS PERKINS.

Witnesses:
F. P. Cleveland,
Wm. S. Bond.